(12) United States Patent
Binkert et al.

(10) Patent No.: US 9,354,412 B2
(45) Date of Patent: May 31, 2016

(54) OPTICAL INTERCONNECT FABRICS AND OPTICAL SWITCHES

(75) Inventors: Nathan Lorenzo Binkert, Redwood City, CA (US); Moray McLaren, Bristol (GB); Michael Renne Ty Tan, Menlo Park, CA (US); Alan Lynn Davis, Coalville, UT (US)

(73) Assignee: Hewlett Packard Enterprise Development LP, Houston, TX (US)

(*) Notice: Subject to any disclaimer, the term of this patent is extended or adjusted under 35 U.S.C. 154(b) by 476 days.

(21) Appl. No.: 13/697,760

(22) PCT Filed: May 19, 2010

(86) PCT No.: PCT/US2010/035352
§ 371 (c)(1),
(2), (4) Date: Nov. 13, 2012

(87) PCT Pub. No.: WO2011/146057
PCT Pub. Date: Nov. 24, 2011

(65) Prior Publication Data
US 2013/0058607 A1  Mar. 7, 2013

(51) Int. Cl.
G02B 6/26 (2006.01)
G02B 6/42 (2006.01)
G02B 6/30 (2006.01)
G02B 6/43 (2006.01)

(52) U.S. Cl.
CPC .................................. *G02B 6/43* (2013.01)

(58) Field of Classification Search
None
See application file for complete search history.

(56) References Cited

U.S. PATENT DOCUMENTS

| 4,748,617 A | 5/1988 | Drewlo |
| 5,058,101 A | 10/1991 | Albanese et al. |

(Continued)

FOREIGN PATENT DOCUMENTS

| CN | 1423754 A | 6/2003 |
| JP | 5235872 | 9/1993 |
| JP | 2002-040302 | 2/2002 |
| WO | WO-01-35137 | 5/2001 |

OTHER PUBLICATIONS

Jacob, Andrew R. "A survey of fast packet switches." ACM SIGCOMM Computer Communication Review 20.1 (1989): 54-64.

(Continued)

*Primary Examiner* — Uyen Chau N Le
*Assistant Examiner* — Chad Smith
(74) *Attorney, Agent, or Firm* — Olympic Patent Works, PLLC

(57) ABSTRACT

Optical interconnect fabrics and optical switches are disclosed. In one aspect, an optical interconnect fabric comprises one or more bundles of optical broadcast buses. Each optical broadcast bus is optically coupled at one end to a node and configured to transmit optical signals generated by the node. The optical fabric also includes a number of optical tap arrays distributed along each bundle of optical broadcast buses. Each optical tap array is configured to divert a portion of the optical power associated with the optical signals carried by a bundle of optical broadcast buses to one of the nodes.

20 Claims, 11 Drawing Sheets

(56) References Cited

U.S. PATENT DOCUMENTS

| | | | |
|---|---|---|---|
| 5,245,680 A | 9/1993 | Sauter | |
| 5,684,899 A | 11/1997 | Ota | |
| 6,374,020 B1* | 4/2002 | Paniccia | 385/47 |
| 6,661,940 B2 | 12/2003 | Kim | |
| 2004/0126065 A1* | 7/2004 | Levy et al. | 385/88 |
| 2005/0276604 A1* | 12/2005 | Morrow et al. | 398/73 |
| 2009/0034906 A1 | 2/2009 | Tan | |
| 2009/0097851 A1* | 4/2009 | Tan et al. | 398/82 |
| 2009/0103929 A1 | 4/2009 | Binkert et al. | |

OTHER PUBLICATIONS

Katsinis, Constantine. "Models of distributed-shared-memory on an interconnection network for broadcast communication." Journal of Interconnection Networks 4.01 (2003): 77-102.

PCT Search Report, PCT/US2010/035352, Korean IPO, Feb. 1, 2011.

International Preliminary Report on Patentability received in PCT Application No. PCT/US2010/035352, Nov. 29, 2012, 6 pages.

* cited by examiner

US 9,354,412 B2

OPTICAL INTERCONNECT FABRICS AND OPTICAL SWITCHES

TECHNICAL FIELD

The present disclosure relates to computer systems, and, in particular, to optical interconnects.

BACKGROUND

Organizations that maintain and manufacture data centers face increasing bandwidth demands. In particular, the bandwidth requirement for routing switches is increasing dramatically due to the growth in data center size and due to the shift to higher bandwidth link standards, such as 10 Gb, 40 Gb, and 100 Gb Ethernet standards. However, simply scaling up the bandwidth of existing electronic switch designs can be problematic. The scope for increasing the data rate of electronic signals is often limited by signal integrity considerations. Also, increasing the bandwidth of electrical signal paths incurs a substantial penalty in both cost and power which may be impractical. The energy efficiency of the switching infrastructure in a modern data center has become an important consideration. As data rates increase, a greater proportion of the power consumed by network switches can be attributed to electronic interconnects. This problem is exacerbated by the fact that, as semiconductor technology improves, wires scale poorly with respect to transistors. The result is that switch manufacturers and users continue to seek interconnect solutions that provide for several generations of bandwidth scaling at reduced interconnect power, without increasing the overall system cost.

DETAILED DESCRIPTION

Disclosed herein are optical interconnect fabrics ("optical fabrics") and optical switches. Optical fabrics and optical switches transmit data encoded in optical signals. An optical signal encodes information in high and low amplitude states or phase changes of a channel of electromagnetic radiation. A channel refers to a single wavelength of electromagnetic radiation or a narrow band of electromagnetic radiation centered about a particular wavelength. For example, a high amplitude portion of an optical signal can represent a logic bit value "1" and a low amplitude portion of the same optical signal can represent a logic bit value "0," or vice versa. Optical fabrics disclosed herein use multiple optical buses implemented in low loss waveguides and optoelectronics to replace the electronic connections and electronic fabric switches found in scalable data center switches. Optical fabrics are less constrained by signal integrity considerations and are amenable to higher spectral efficiency through the use of wavelength division multiplexing ("WDM") and various modulation formats. Optical communication with optical signals can also be more power efficient than electronic communication with electronic signals due to the low loss of optical channels.

Multi-Bus Optical Interconnect Fabrics

Figure 1:
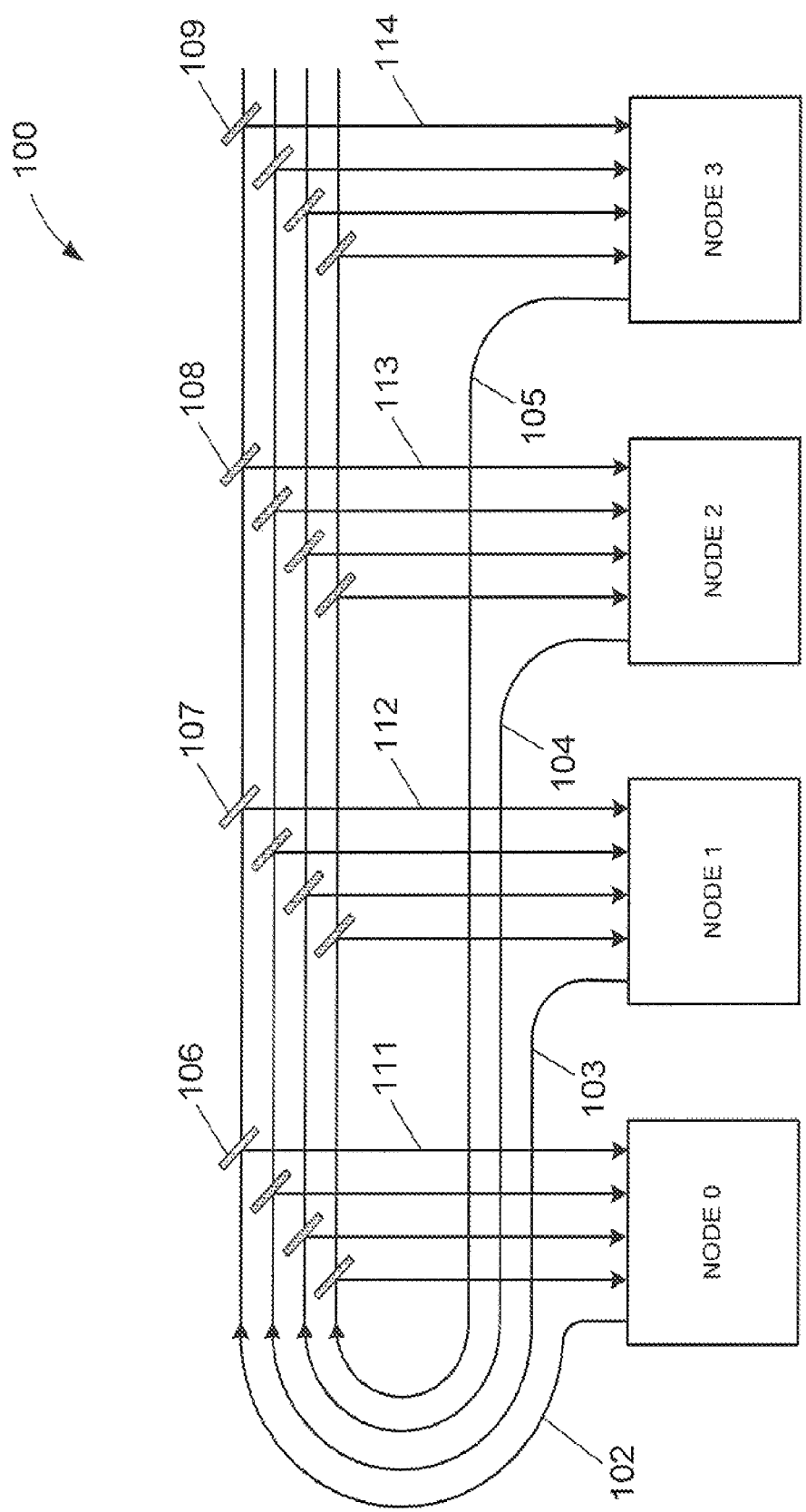
FIG. 1 shows a schematic representation of a first example multi-bus optical interconnect fabric.

FIG. 1 shows a schematic representation of an example multi-bus optical interconnect fabric 100. The optical fabric 100 includes four optical broadcast buses ("broadcast buses") 102-105 enabling each of the four nodes labeled 0, 1, 2, and 3 to broadcast optical signals to itself and to three other nodes. As shown in the example of FIG. 1, each broadcast bus is optically coupled at one end to one of the nodes 0, 1, 2, and 3. A node can include any combination of processors, memory, memory controllers, electrical-to-optical engines, optical-to-electrical engines, clusters of multi-core processing units, a circuit board, external network connections, or any other data processing, storing, or transmitting device. For example, the nodes 0-3 can be line cards in an optical communication switch, as described below in the subsequent subsection. In the example of FIG. 1, the optical fabric 100 includes 16 optical tap arrays distributed so that four optical tap arrays are located along each broadcast bus. Each optical tap array is configured to divert a portion of the optical power associated with the optical signals carried by a broadcast bus to a corresponding node. For example, four optical tap arrays 106-109 are distributed along broadcast bus 102. When node 0 broadcast optical signals over broadcast bus 102, optical tap array 106 diverts a portion 111 of the optical power associated with the optical signals back to node 0, optical tap array 107 diverts a portion 112 of the optical power associated with the optical signals to node 1, optical tap array 108 diverts a portion 113 of the optical power associated with the optical signals to node 2, and optical tap array 109 diverts a portion 114 of the optical power associated with the optical signals to node 3. As a result, nodes 0, 1, 2, and 3 receive the same information encoded in the optical signals broadcast by node 0, but at a fraction of the optical power associated with the optical signals output from node 0.

Figure 2:
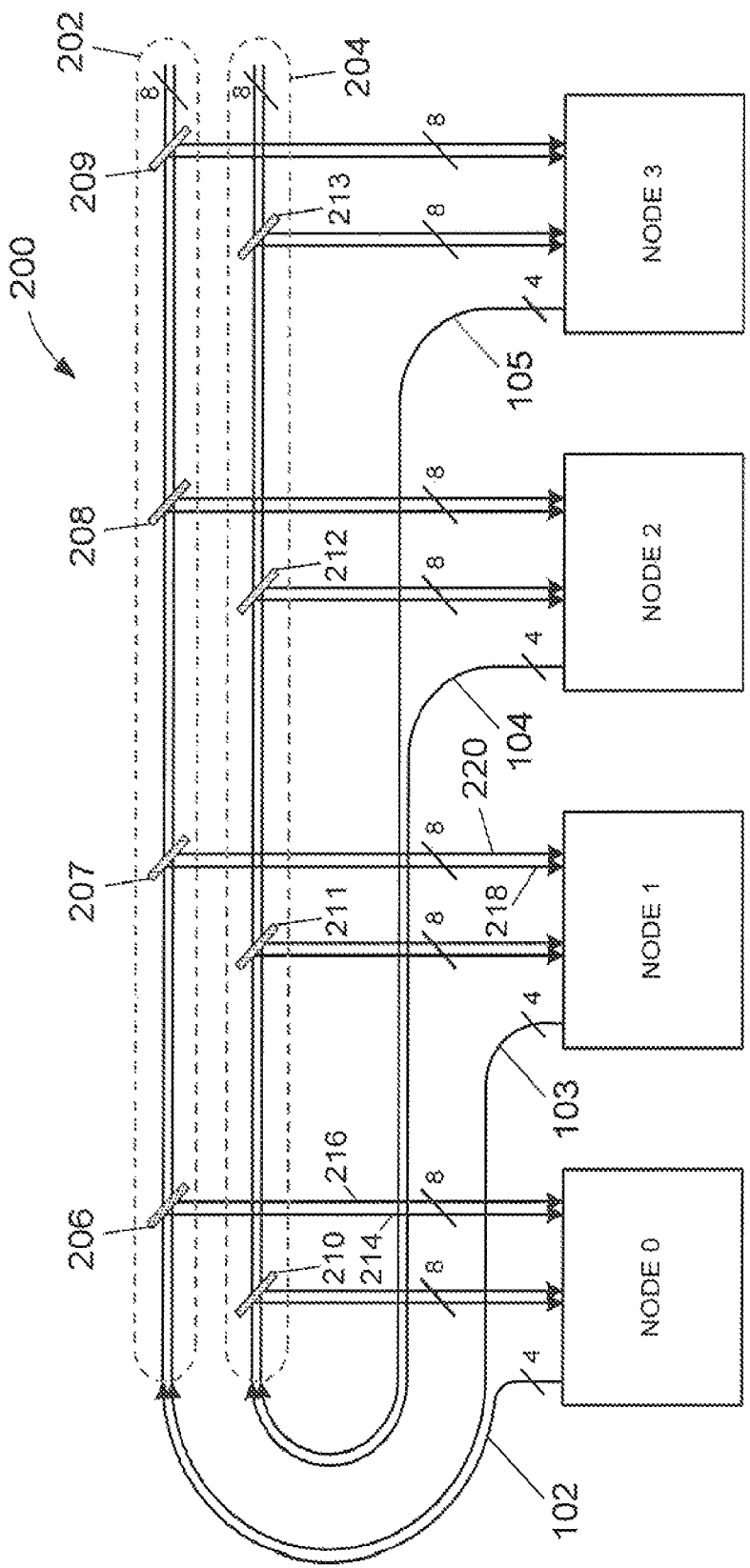
FIG. 2 shows a schematic representation of a second example multi-bus optical interconnect fabric.

In other examples, the broadcast buses of multi-bus optical fabrics are bundled reducing the number of optical tap arrays. FIG. 2 shows a schematic representation of an example multi-bus optical interconnect fabric 200. The optical fabric 200 is similar to the optical fabric 100, but instead the broadcast buses are bundled and each optical tap array spans the broadcast buses in a bundle. In particular, optical fabric 200 includes the same four broadcast buses 102-105 as optical fabric 100, but with broadcast buses 102 and 103 bundled to form a bundled broadcast bus 202 and broadcast buses 104 and 105 bundled to form a bundled broadcast bus 204. Optical fabric 200 includes four optical tap arrays 206-209 distributed bundled broadcast bus 202 and four optical tap arrays 210-213 distributed along bundled broadcast bus 204. Each optical tap array is configured to divert a portion of the optical power associated with optical signals carried by a bundled broadcast bus to a corresponding node. For example, suppose that node 0 is broadcasting a First set of optical signals on broadcast bus 102 and node 1 is broadcasting a second set of optical signals on broadcast bus 103. Optical tap array 206 is configured to divert a portion 214 of the optical power associated with the first set of optical signal back to node 0 and divert a portion 216 of the optical power associated with the second set of optical signals to node 0. Optical tap array 207 is configured to divert a portion 218 of the optical power associated with the first set of optical signals to node 1 and divert a portion 220 of the optical power associated with the second set of optical signals back to node 1. Optical tap arrays 208 and 209 divert portions of the optical power associated with the first and second sets of optical signals to nodes 2 and 3, respectively. As a result, the nodes 0, 1, 2, and 3 receive the same information encoded in the first and second sets of optical signals broadcast by nodes 0 and 1.

In the example of FIG. 2, the broadcast buses are composed of four waveguides. For example, as shown in FIG. 2, where broadcast bus 102 couples to node 0 slash "/" with the number "4" indicates that broadcast bus 102 is composed of tour waveguides, and where optical tap array 206 diverts portions 214 and 216 of the optical power carried by bundled broadcast bus 202 of optical signals to node 0 is composed of waveguides.

Figure 3:
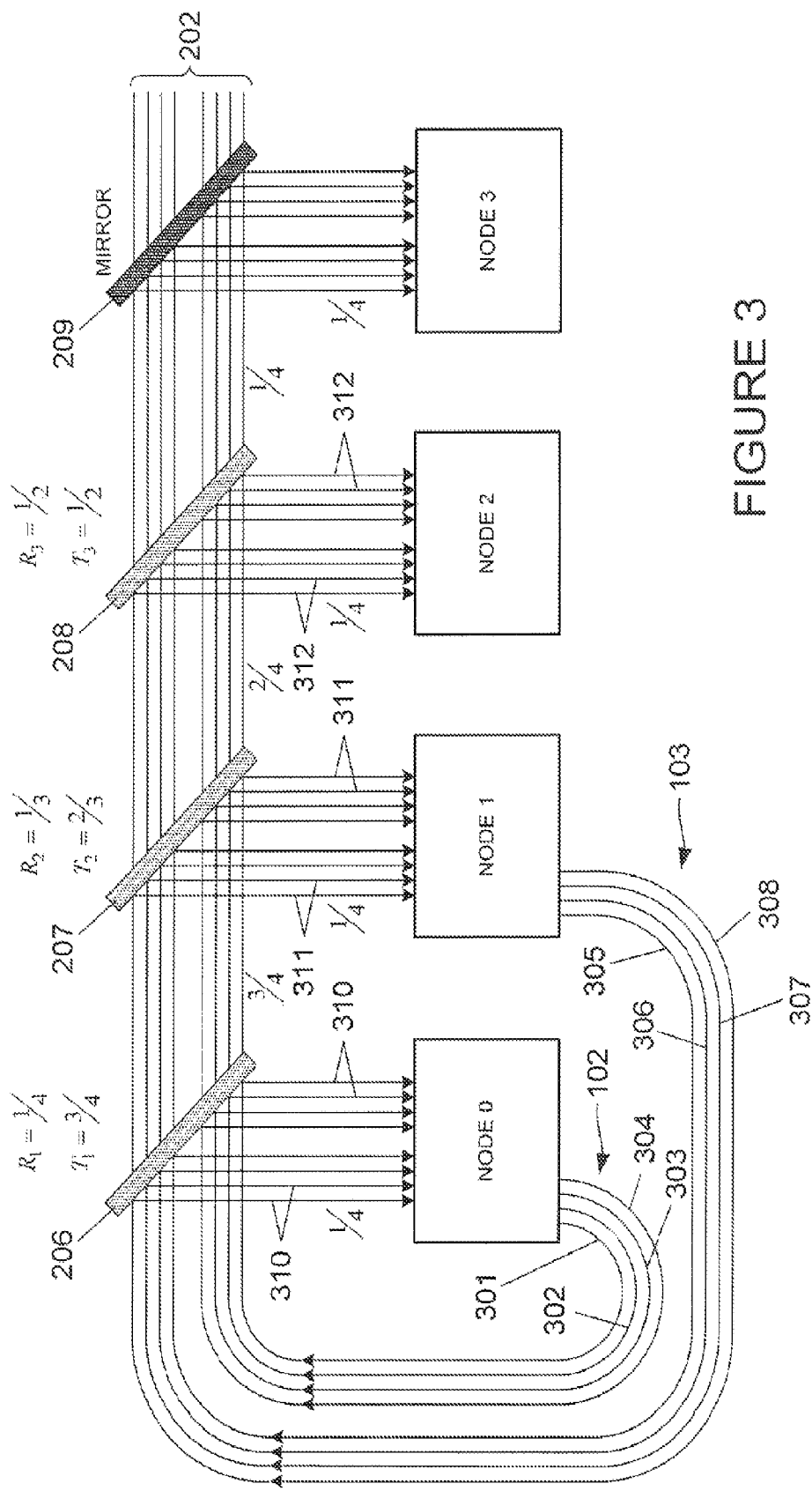
FIG. 3 shows an example of bundles of waveguides associated with two broadcast buses.

FIG. 3 shows the waveguides comprising the broadcast buses 102 and 103. In particular, broadcast bus 102 is composed of waveguides 301-304, and broadcast bus 103 is composed of waveguides 305-308. Each waveguide of a broadcast bus can transmit a separate optical signal generated by a node. For example, node 0 can broadcast data encoded in four separate optical signals, each optical signal carried by one of the four waveguides 301-304. Each optical tap array is composed of a number of optical taps, each of which is configured to divert a portion of the optical power associated with an optical signal carried by one of the waveguides. For example, optical tap array 206 is composed of eight optical taps (not shown) with each optical tap configured to divert a portion of the optical signal carried by one of the waveguides 301-308 toward node 0.

FIG. 3 also reveals how the optical tap arrays can be configured to divert, using partial reflection, a portion of the optical power associated with the optical signals transmitted in the bundles of broadcast buses. In certain examples, the optical tap arrays distributed along a broadcast bus, or bundle of broadcast buses, can be configured so that each node receives approximately the same optical power associated with each optical signal. For example, as shown in the example of FIG. 3, suppose that the optical power associated with each optical signal carried by the waveguides 301-308 is represented by P. In order for each node to receive the optical signals with approximately the same optical power P/4, optical tap array 206 is configured to reflect approximately ¼ and transmit approximately ¾ of the optical power of each optical signal carried by the waveguides 301-308. As a result, the optical power of each optical signal 310 reflected toward node 0 is approximately P/4, and the optical power of each transmitted optical signal is approximately 3P/4. The optical tap array 207 is configured to reflect approximately ⅓ and transmit approximately ⅔ of the optical power of each optical signal carried by the waveguides 301-308. As a result, the optical power of each optical signal 311 reflected toward node 1 is approximately P/4 (i.e., ⅓×3P/4), and the optical power of each transmitted optical signal is approximately P/2 (i.e., ⅔×3P/4). The optical tap array 208 is configured to reflect and transmit approximately ½ of the optical power of the optical signals carried by waveguides 301-308. As a result, the optical power of each optical signal 312 reflected toward node 2 is approximately P/4 (i.e., ½×P/2), and the optical power of each transmitted optical signal is also approximately P/4 (i.e. ½×P/2). The optical tap array 209 can be a fully reflective mirror that reflects the optical signals with the remaining optical power, P/4, to node 3.

Multi-bus optical interconnect fabrics are not limited to optically interconnecting four nodes. In other examples, optical fabrics can be configured to accommodate as few as 2 nodes and as many as 5, 6, 7, or 8 or more nodes. The maximum number of nodes may be determined by the optical power of the optical signals, the overall system loss, and the minimum sensitivity of the receivers used to detect the optical signals located at each node, as described below with reference to FIG. 5. In general, the optical tap arrays distributed along a broadcast bus, or bundle of broadcast buses, are configured so that when an optical signal is broadcast by a node, each of the nodes, including the broadcasting node, receives approximately 1/n of the total optical power P of the optical signal, where n is the number of nodes.

Figure 4:
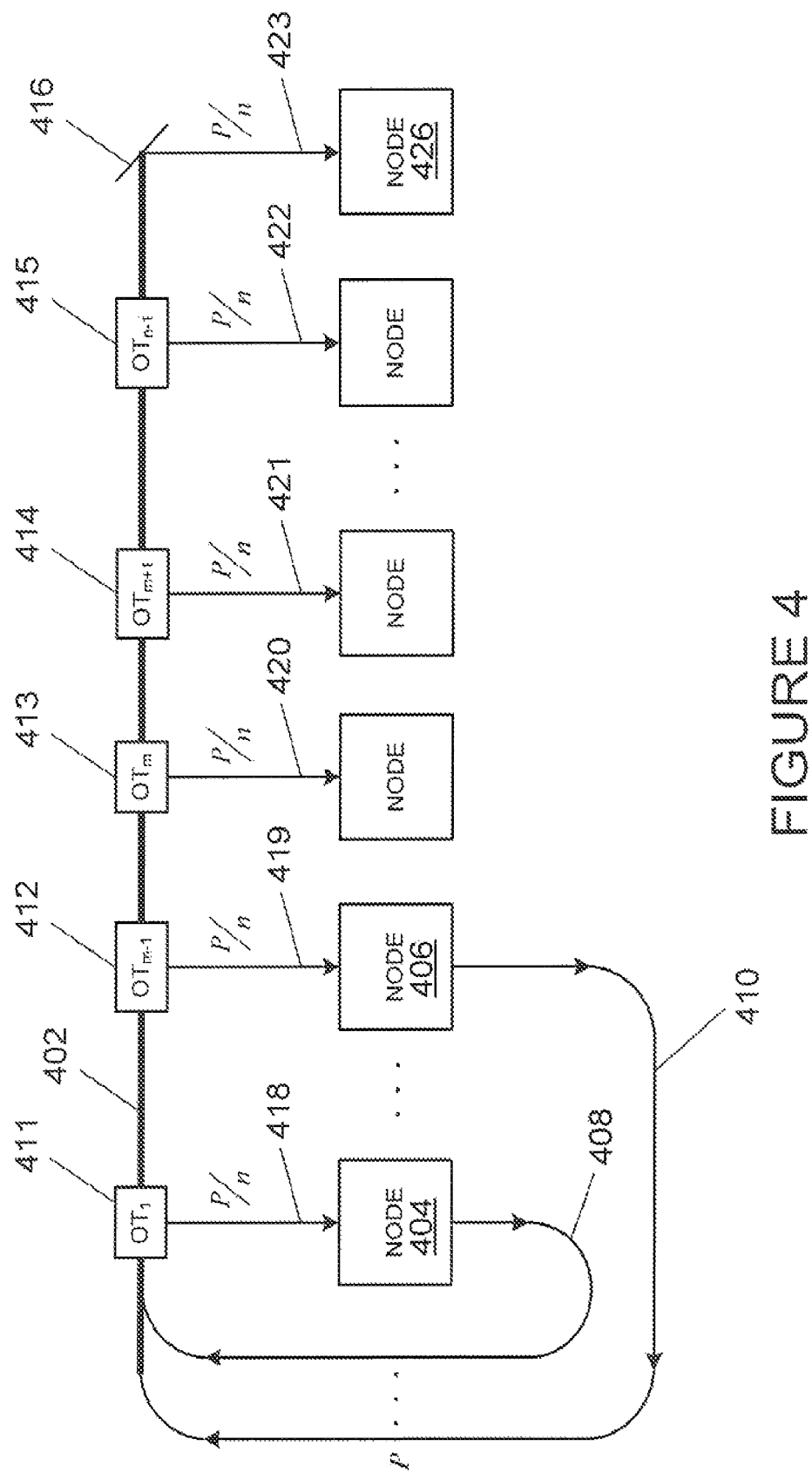
FIG. 4 shows a schematic representation of n nodes in optical communication over a bundle of broadcast buses.

FIG. 4 shows an example of n nodes in optical communication with a bundle of broadcast buses 402 coupling n nodes, two of which are represented by nodes 404 and 406. The broadcast buses. such as broadcast buses 408 and 410, comprising the bundle of broadcast buses 402 can be composed of any suitable number of waveguides. The optical fabric includes n optical tap arrays distributed along the bundle of broadcast buses 402, a few of which are represented by optical tap arrays 411-416. Node 406 outputs optical signals onto the broadcast bus 410 with optical power P. The optical tap arrays are configured so that each node receives a reflected portion of the optical signals with approximately the same optical power of P/n, as indicated by directional arrows 418-423.

The optical tap arrays denoted by $OT_m$ in FIG. 4 reflect a fraction of the optical signal power to an optically coupled node in accordance with:

$$R_m \approx \frac{1}{(n-m+1)}$$

and transmit a fraction of the optical signal power in accordance with:

$$T_m \approx \frac{(n-m)}{(n-m+1)}$$

where in is an integer ranging from 1 to n. Thus, an optical tap array $OT_m$ receives an optical signal and outputs a reflected portion with optical power $PR_m$ toward an optically coupled node and outputs a transmitted portion with optical power $PT_m$, where $P=PR_m+PT_m+L_m$ with $L_m$, representing the optical power loss at the optical tap array $OT_m$ due to absorption. scattering. or misalignment. Note that the optical tap array 416 $OT_n$ can be a mirror that reflects all the remaining optical power transmitted by broadcast bus 402 to node 426.

Note that optical fabric examples describe diverting a portion of the optical signals generated by a node back to the same transmitting node. This is done for two primary reasons: 1) It ensures that the mirror reflectivity is identical for all the taps in an array of taps, and that this tap structure is identical at each point on the bus except for the value of reflectivity of the tap array mirror. In practice, the optical tap arrays can be fabricated as a single piece of material and are distributed across all of the waveguides of a bundle of broadcast buses, as shown in FIGS. 2 and 3. In other words, it may not be practical in implementing an optical fabric with large numbers of waveguides per bundle with optical tap arrays that distinguish particular waveguides for not diverting optical signals. 2) By diverting optical signals back to the node from which they originated, the node is able to perform diagnostic tests on the optical signals, such as testing optical signal integrity.

In other examples, the broadcast buses of a multi-bus optical interconnect fabric can be implemented using star couplers. For example, returning to FIG. 1, a star coupler comprising one input port and four output ports can replace the broadcast bus 1 and optical tap arrays 106-109, where the input port carries the optical signals carried by broadcast bus 102 and each of the four output ports carriers one of the optical signals 111-114. Each star coupler can be configured so that an optical signal received in the input port is split into four output optical signals, each output optical signal carrying approximately ¼ of the optical power of the input optical signal.

Figure 5:
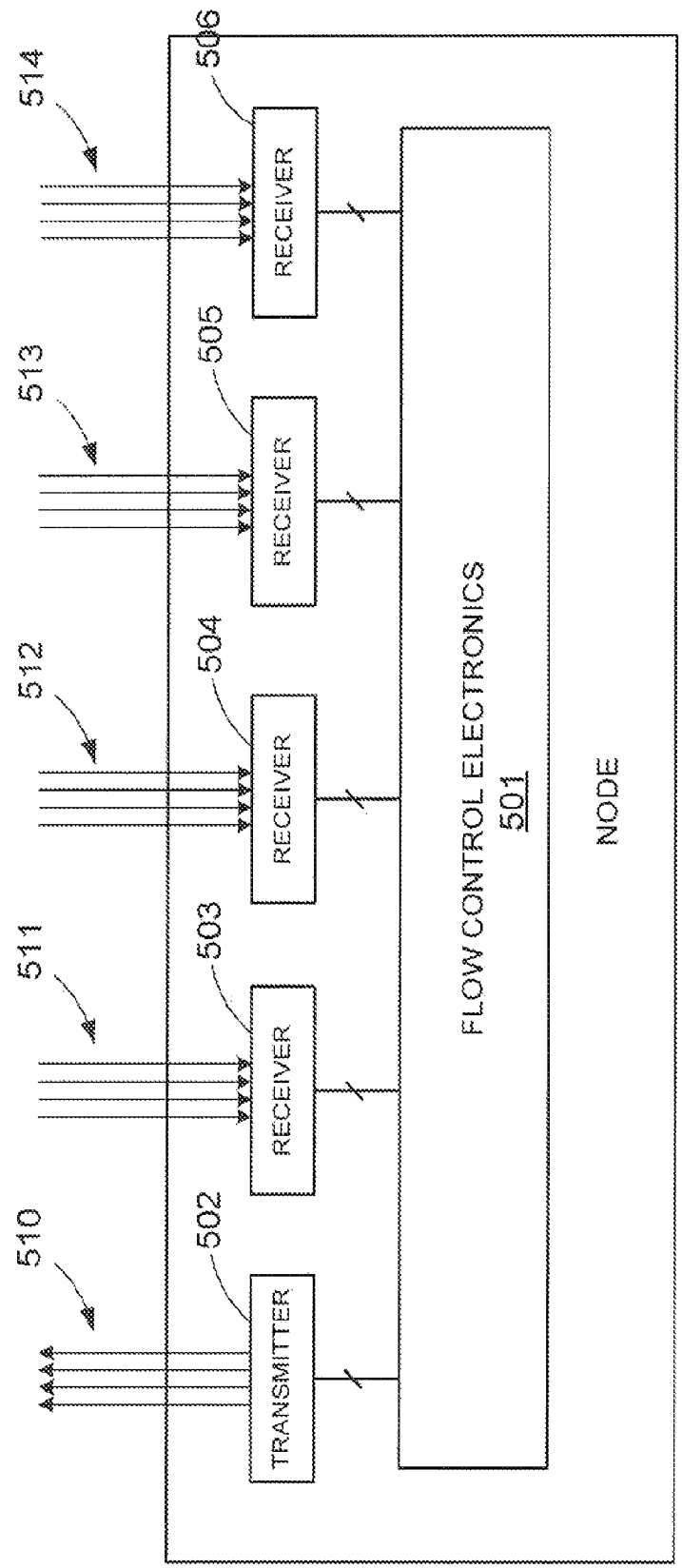
FIG. 5 shows a schematic representation of a node including flow-control electronics and a transceiver.

Returning to FIGS. 1 and 2, each of the nodes 0-3 includes flow-control electronics and a transceiver. FIG. 5 shows a schematic representation of a node including flow-control electronics 501 and an example transceiver comprising a transmitter 502 and four receivers 503-506. As shown in the example of FIG. 5, the flow-control electronics 508 are in electronic communication with the transmitter 502 and the receivers 503-506. The transmitter 502 can be configured with an array of light-emitting sources, such as light-emitting diodes, semiconductor edge-emitting lasers, or vertical-cavity surface-emitting lasers ("VCSELs"). In certain examples, the sources can be configured to emit electromagnetic radiation with approximately the same wavelength. In other examples, each source can be configured to emit a different wavelength providing for dense-wave division multiplexing channel spacing. In still other examples, the sources can be configured to emit wavelengths in wavelength ranges providing for coarse-wave division multiplexing channel spacing. The use of wavelength division multiplexing reduces the number of waveguides needed for the same number of channels. In the example shown in FIG. 5, the transmitter 502 comprises 4 sources, each of which is separately controlled by the flow-control electronics 508 to emit an optical signal. The transmitted may include separate electronically operated modulators for modulating each channel of light generated by the transmitter 502. Directional arrows 510 each represent a separate optical signal generated by a corresponding source. In certain examples, the optical signals 210 can be sent in separate waveguides of a broadcast bus in the multi-bus optical interconnect fabric. For example, with reference to FIG. 3, the transmitter 502 can represent the transmitter of node 0 with each of the 4 optical signals 510 carried by one of the waveguides 301-304.

Each of the receivers 503-506 comprises an array of photodetectors. The photodetectors can be p-n junction or p-i-n junction photodetectors. Sets of arrows 511-514 each represent 4 optical signals generated by different nodes in the same manner as the optical signals generated by the transmitter 502. For example, referring to FIG. 3, the sets of optical signals 511 and 512 correspond to optical signals 310. In certain examples, each optical signal can be carried to a photodetector of a receiver via a separate waveguide. In other examples, each optical signal can be optically coupled directly from the associated broadcast bus to a photodetector of a receiver.

Figure 6:
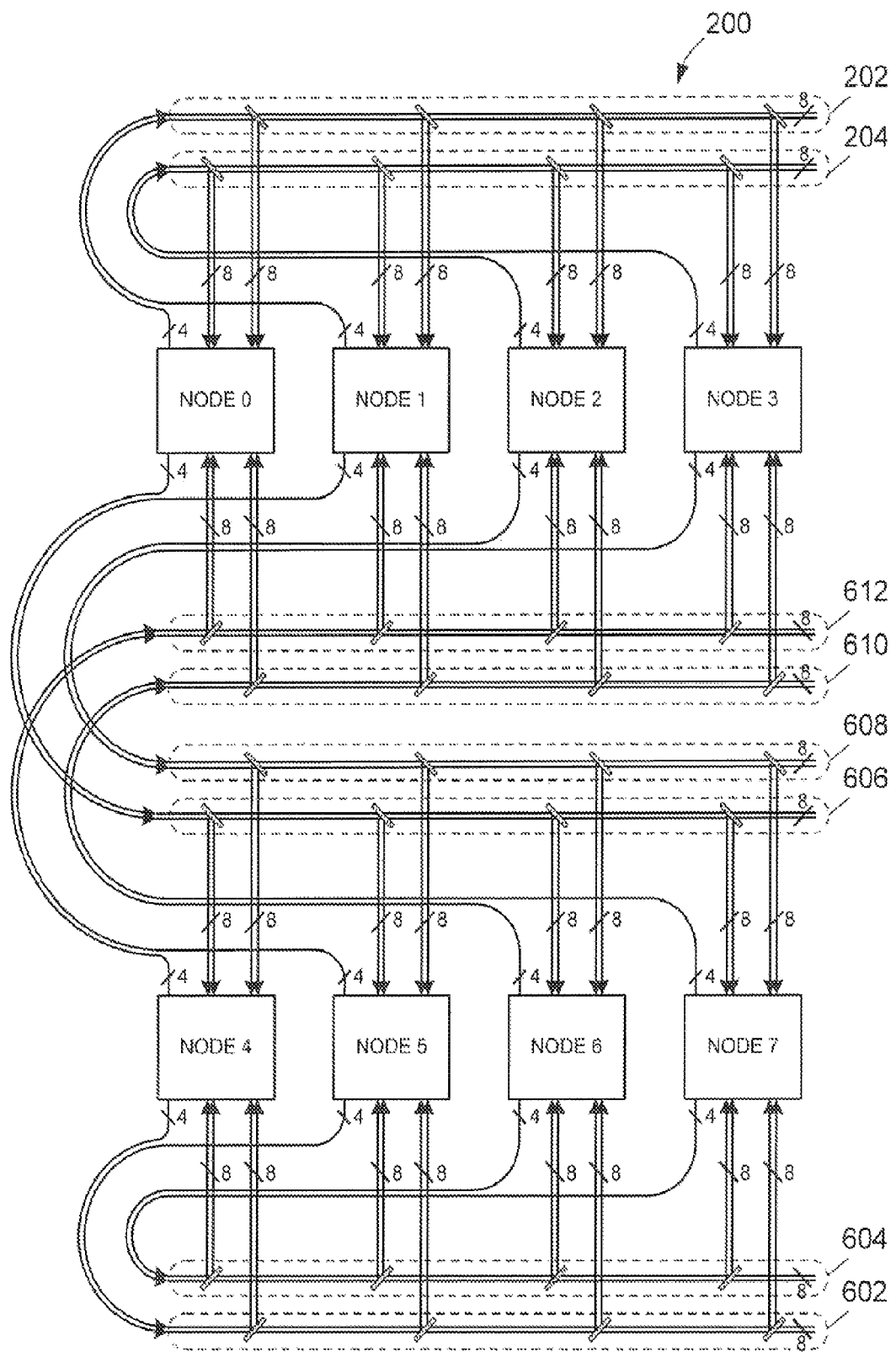
FIG. 6 shows a schematic representation of four multi-bus optical interconnect fabrics.

Examples herein are not limited to nodes broadcasting over a single multi-bus optical interconnect fabric. In other examples, nodes can communicated over more than one multi-bus optical interconnect fabric. FIG. 6 shows a schematic representation of an example of four multi-bus optical interconnect fabrics enabling eight nodes to broadcast optical signals. As shown in the example of FIG. 6, nodes 0-3 broadcast optical signals over optical fabric 200, as described above. Like nodes 0-3 described above, nodes 4-7 broadcast optical signals to each other over bundles of broadcast buses 602 and 604. FIG. 6 also reveals that nodes 0-3 broadcast optical signals to nodes 4-7 over bundles of broadcast buses 606 and 608. and that nodes 4-7 broadcast optical signals to nodes 0-3 over bundles of broadcast buses 610 and 612.

Implementations of Multi-Bus Optical Interconnect Fabrics

Figure 7A:
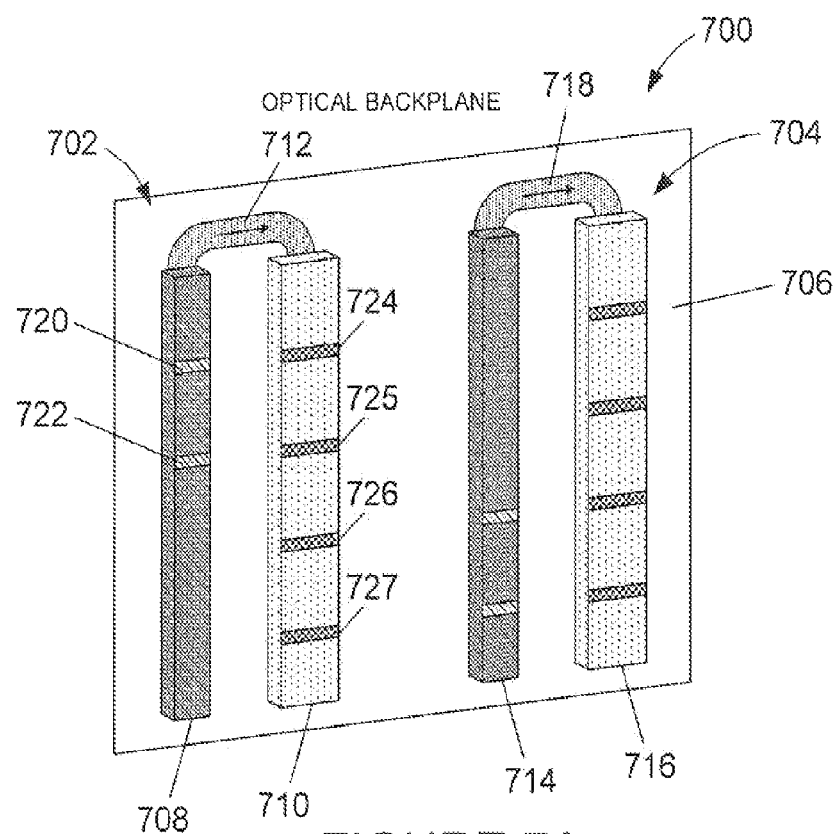
FIG. 7A shows an isometric view of a first example optical backplane.

Examples herein include optical backplanes that can be replace electrical backplanes of a switch. The optical backplanes are configured with implementations of the multi-bus optical interconnect fabrics described above. FIG. 7A shows an isometric view of an optical backplane 700 comprising a first bundle of broadcast buses 702 and a second bundle of broadcast buses 704 mounted on a board 706. Each bundle of broadcast buses corresponds to one of the bundles of broadcast buses 202 and 204 described above with reference to FIG. 2 and is implemented with two waveguide assemblies and a fiber ribbon. For example, the first bundle of broadcast buses 702 is implemented with waveguide assemblies 708 and 710 connected by a fiber ribbon 712, and the second bundle of broadcast buses 704 is implemented with waveguide assemblies 714 and 716 connected by a fiber ribbon 718. The waveguide assemblies 708, 710, 714 and 716 include windows through which optical signals can be input and output. For example, waveguide assembly 708 includes windows 720 and 722 through which optical signals can be input, and waveguide assembly 710 includes windows 724-727 through which optical signals can be output.

The first and second bundles of broadcast buses 702 and 704 include waveguides and optical tap arrays that implement the broadcast buses 202 and 204 of the optical fabric 200 describes above with reference to FIG. 2. In practice, each broadcast bus is composed of a number of bundled waveguides. The waveguides can be optical fibers or hollow waveguides. A hollow waveguides is composed of a tube with an air core. The structural tube forming the hollow waveguide can have inner core materials with refractive indices greater than or less than one. The tubing can be composed of a suitable metal. glass, or plastic and metallic and dielectric films can be deposited on the inner surface of the tubing. The hollow waveguides can be hollow metal waveguides with high reflective metal coatings lining the interior surface of the core. The air core can have a cross-sectional shape that is circular, elliptical. square, rectangular, or any other shape that is suitable for guiding light. Because the waveguide is hollow, optical signals can travel along the core of a hollow waveguide with an effective index of about 1. In other words, light propagates along the core of a hollow waveguide at the speed of light in air or vacuum. The optical tap arrays can be implemented with pellicle beamsplitters fabricated to achieve a specific reflectivity and transmissivity. A pellicle beamsplitter is composed of a thin dielectric coated membrane suspended over a cavity etched into a silicon frame. Pellicle beamsplitter are typically polarization independent over a wide optical bandwidth, typically have no beam walk-off, typically have no ghost images or undesirable reflections, and typically do not introduce mode selective loss.

Figure 7B:
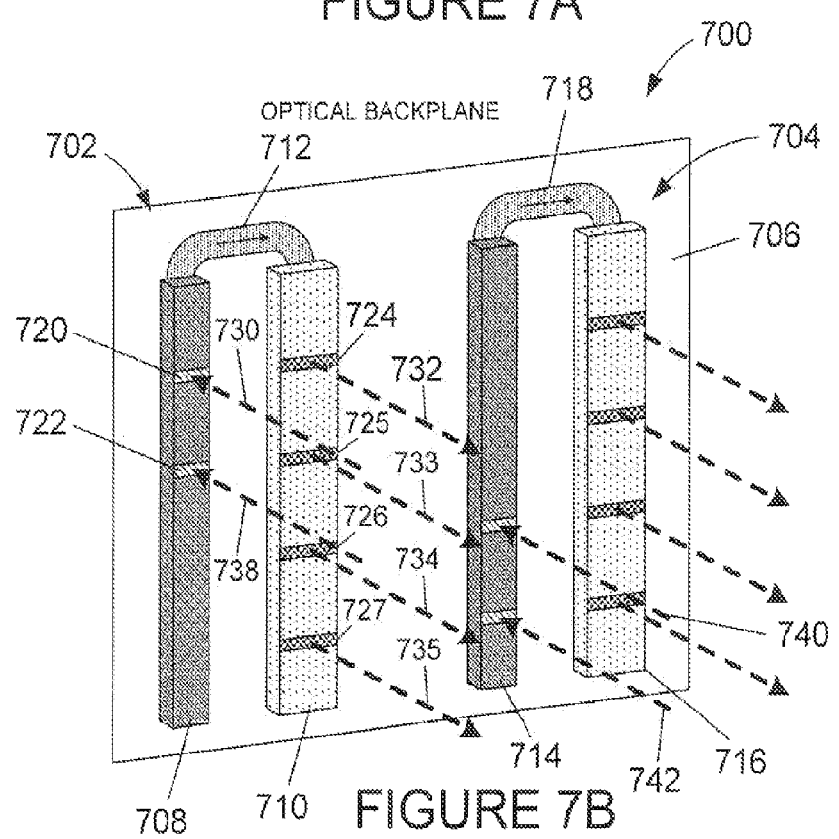
FIG. 7B shows the optical backplane shown in FIG. 7A operated in accordance with one or more examples.

FIG. 7B shows operation of the optical backplane 700. Optical signals input through windows in optical assemblies 708 and 714 are broadcast through the windows in associated waveguide assemblies 710 and 716. For example, consider a set of optical signals 730 input to waveguide assembly 708 through window 720. The optical signals are directed by the waveguide assembly 708 through fiber ribbon 712 to the waveguide assembly 710 which is configured with optical tap arrays (not shown) located at the windows 724-727. The optical tap arrays perform the same function as the optical tap arrays described above with reference to FIGS. 2 and 3 by diverting portions of the optical power associated with the optical signals entering the waveguide assembly 710 out through each of the windows 724-727. In other words, each of the optical signals 732-735 output through windows 724-727 encodes the same information as the optical signals 730 input through window 720 but each of the optical signals 732-735 has approximately ¼ of the optical power of the optical signals 730, as described above with reference to FIG. 3. The optical signals 738 input through window 722 are similarly broadcast through windows 724-727. Also. optical signals 740 and 742 input through windows in the waveguide assembly 714 are similarly broadcast through the windows in the waveguide assembly 716.

Figure 8:
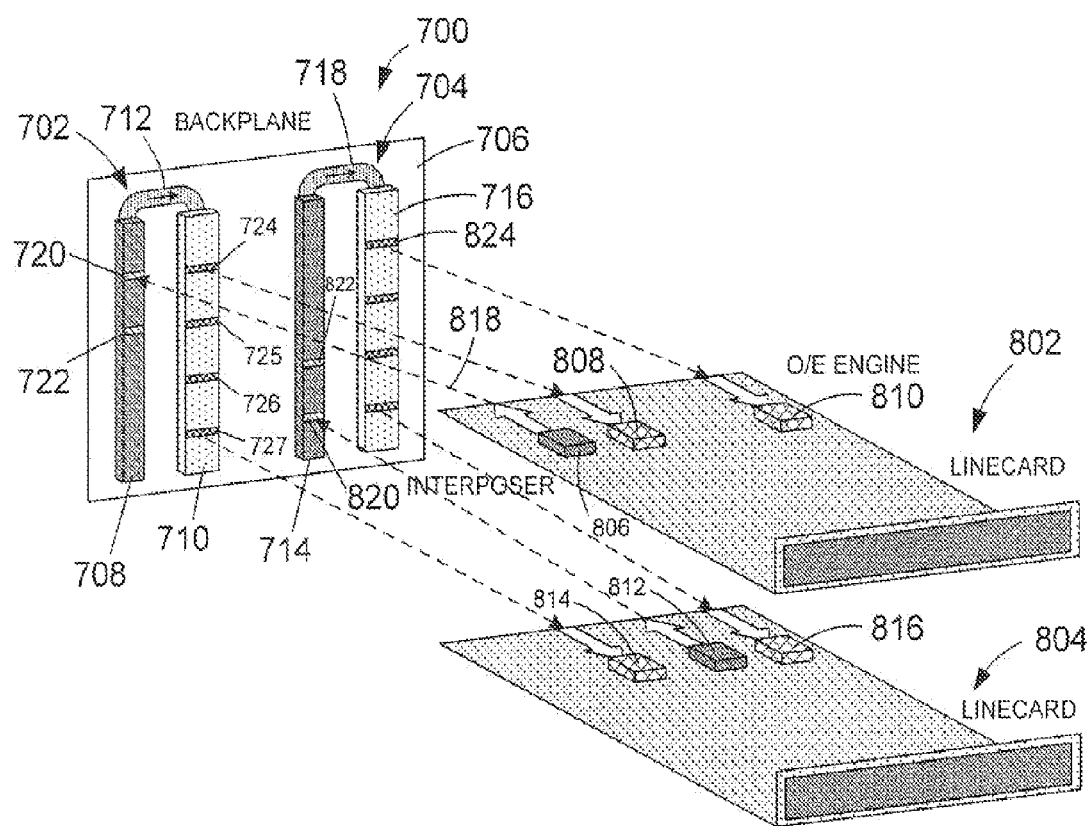
FIG. 8 shows an isometric view of two example line cards interfacing with the backplane shown in FIG. 7A.

The first and second bundles of broadcast buses 702 and 704 enable four line cards of an optically connected switch to broadcast optical signals to each other, as described above with reference to FIG. 2. Each line card can be configured to provide multiple external switch ports connected by an internal electronic switch fabric. FIG. 8 shows an isometric view of two example line cards 802 and 804 configured to optically connect with the backplane 700. Line card 802 includes an interposer 806 and two optical-to-electrical ("OE") engines 808 and 810, and line card 804 includes an interposer 812 and two OF engines 814 and 816. The interposers 806 and 812 convert electrical signals into optical signals encoding the same data. and OE engines 808. 810. 814, and 816 convert optical signals into electrical signals encoding the same data. The line card 802 is configured to broadcast optical signals generated by the interposer 806 using the first bundle of broadcast buses 702 and receive broadcast optical signals through both bundles of broadcast buses 702 and 704. In particular, optical signals 818 generated by the line card 802 are input through the window 720 and broadcast to itself and three other lines cards through windows 724-727. Line card 802 also receives optical signals input through window 722 by another line card (not shown) via window 724, and the line card 802 receives optical signals originally input through windows 820 and 822 via window 824.

Figure 9:
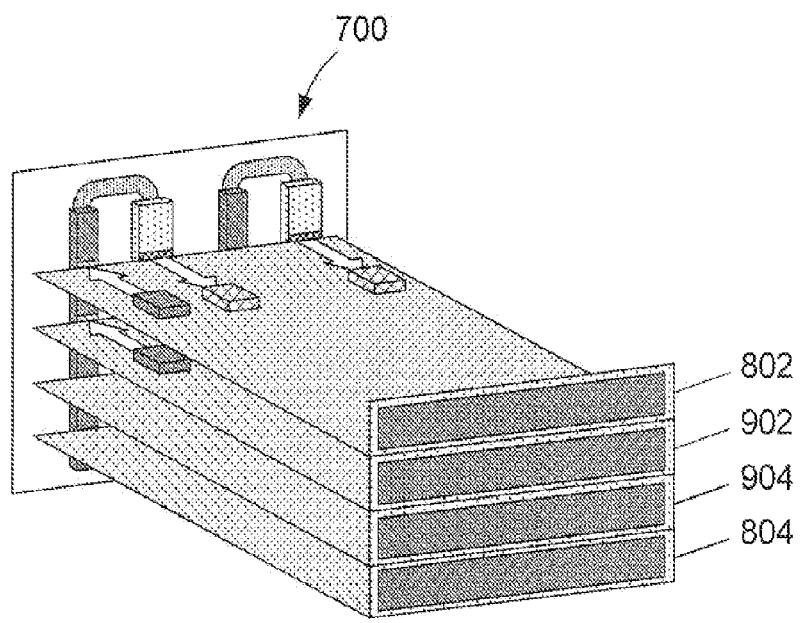
FIG. 9 shows an isometric view of four line cards connected to the broadcast buses of the optical backplane shown in FIG. 7.

FIG. 9 shows an isometric view of the line cards 802 and 804, along with two other line cards 902 and 904, connected to the first and second bundles of broadcast buses 702 and 714 of the optical bus 700.

Figure 10:
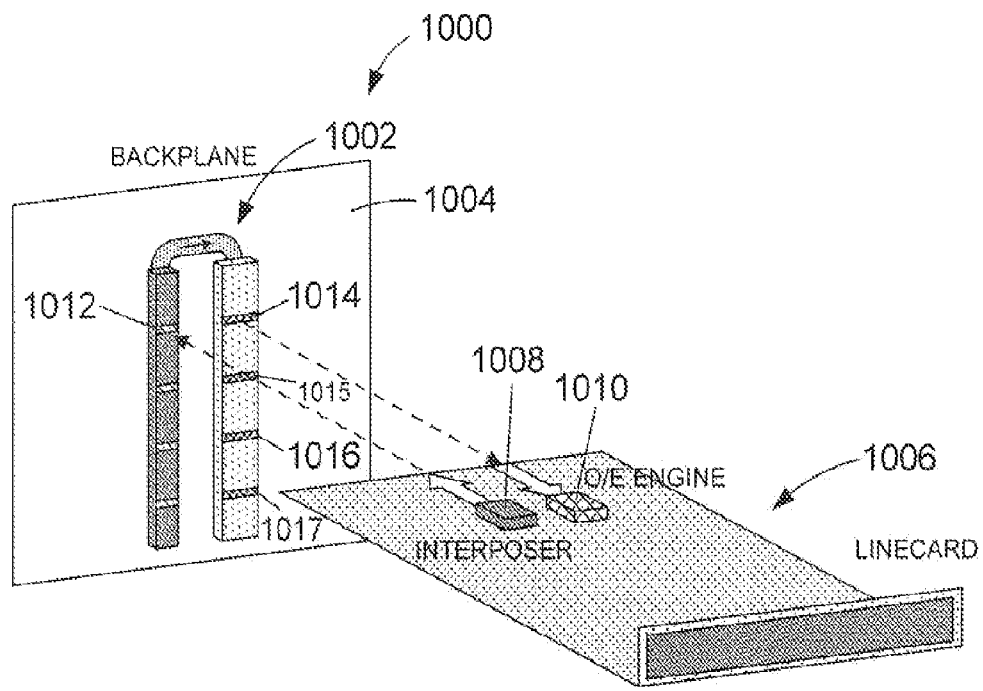
FIG. 10 shows an isometric view of a second example optical backplane.

In other examples, the waveguides of first and second bundles of broadcast buses 702 and 704 can be further bundled together to form a single broadcast bus. FIG. 10 shows an isometric view of an optical backplane 1000 comprising a broadcast bus 1002 disposed on a board 1004. The bundle of broadcast buses 1002 performs the same broadcast operations as the first and second bundles of broadcast buses 702 and 704. In other words, the bundle of broadcast buses 1002 implements the optical fabric 200 shown in FIG. 2 by further bundling the bundles of broadcast buses 202 and 204 into a single bundle of broadcast buses. FIG. 10 also includes an isometric view of a line card 1006 comprising an interposer 1008 and an OE engine 1010. The bundle of broadcast buses 1002 enables the line card 1006 to input optical signals through window 1012 and broadcast the optical signals to itself and three other lines cards (not shown) via windows 1014-1017. The line card 1006 receives optical signals broadcast by three other lines cards (not shown) via window 1014.

Figure 11:
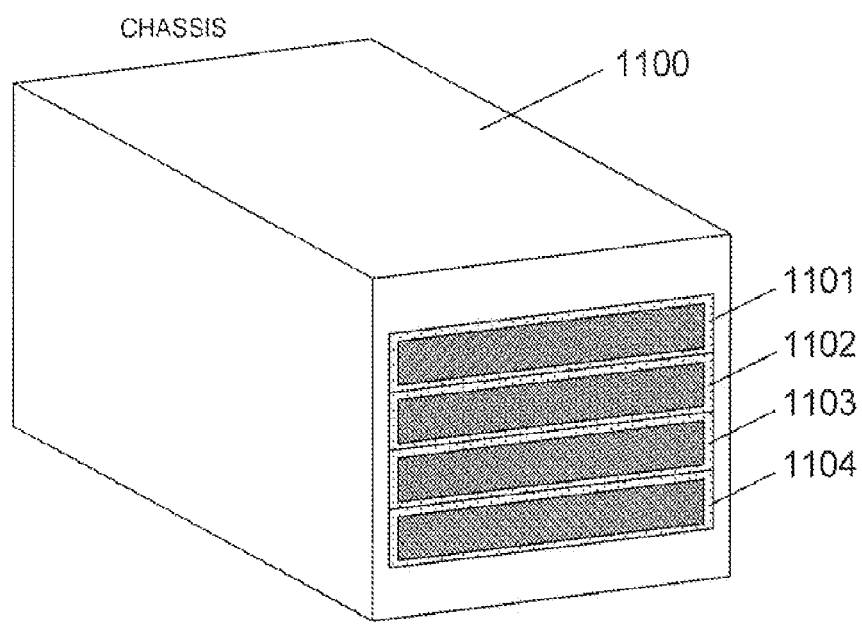
FIG. 11 shows an isometric view of a first optical switch configured with four line cards.

The optical backplanes 700 and 1000 can be implemented in an example optical switch 1100 comprising four stacked line cards 1101-1104, as shown in FIG. 11. The stack of four line cards 1101-1104 are connected through an optical backplane, such as backplanes 700 and 1000, and mounted in a chassis that provides a support structure for the line cards.

Optical switch examples herein are not limited to stacks of four line cards. In other optical switch examples, the number of line cards in a single stack of line cards can range from as few as 2 or 3 to 5, 6, 7, or 8 or more line cards.

Figure 12:
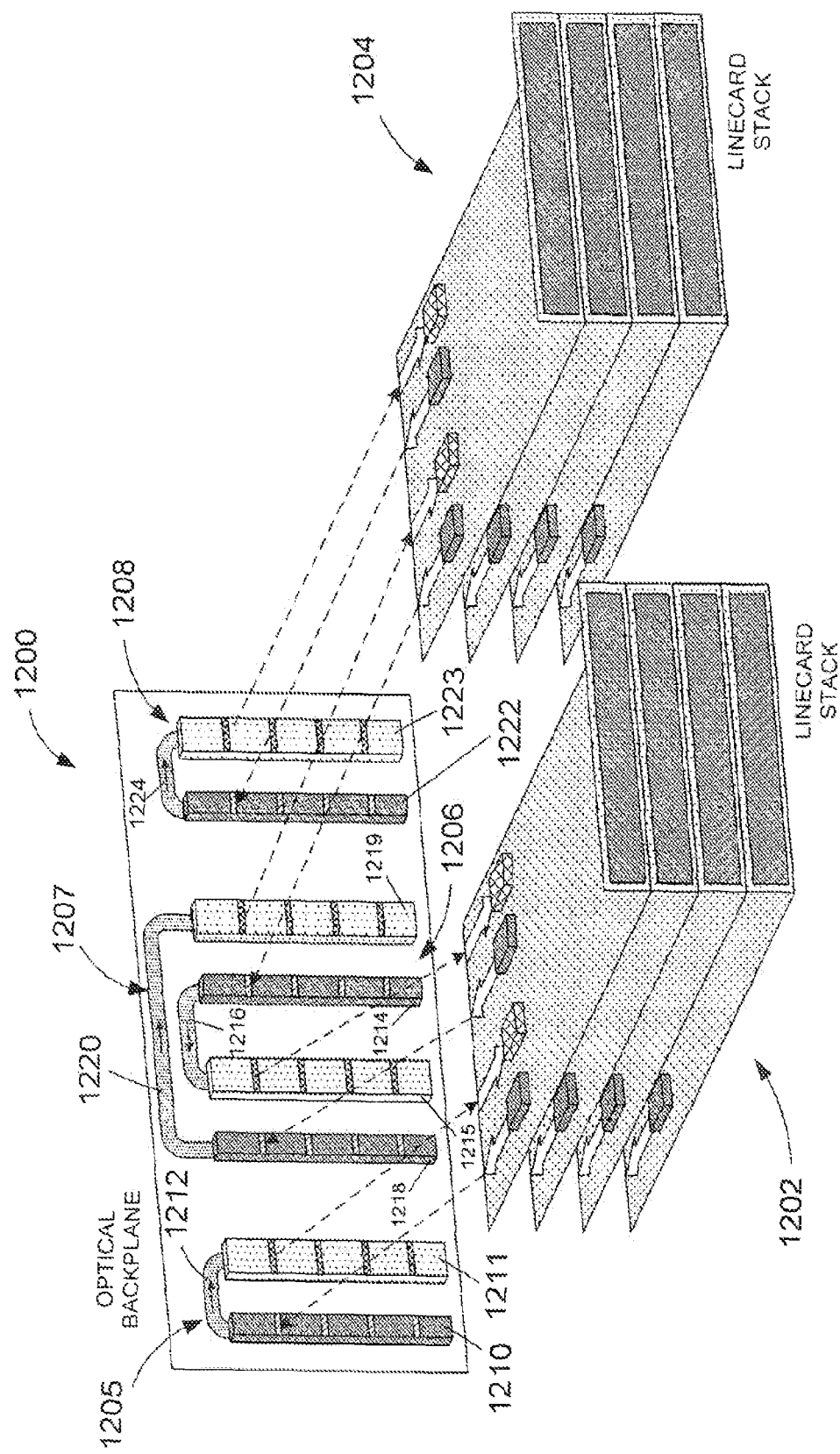
FIG. 12 shows an isometric view and schematic representation of a second example optical backplane.

FIG. 12 shows an isometric view and schematic representation of an optical backplane 1200 configured to support a first stack of four line cards 1202 and a second stack of four line cards 1204. The optical backplane 1200 includes four broadcast buses 1205-1208. Bundle of broadcast buses 1205 includes waveguide assemblies 1210 and 1211 connected by fiber ribbon 1212; bundle of broadcast buses 1206 includes waveguides assemblies 1214 and 1215 connected by fiber ribbon 1216; bundle of broadcast buses 1207 includes waveguide assemblies 1218 and 1219 connected by fiber ribbon 1220; and bundle of broadcast buses 1208 includes waveguide assemblies 1222 and 1223 connected by fiber ribbon 1224. The optical backplane 1240 can implement the schematic representation of the bundles of broadcast buses shown in FIG. 6. Each bundle of broadcast buses 1205-1208 is configured to operate in the same manner as the broadcast bus 1002, described above with reference to FIG. 10. In particular, the bundle of broadcast buses 1205 enables the four line cards of the first stack of line cards 1202 to broadcast optical signals to each other, and the bundle of broadcast buses 1208 enables the four line cards in the second stack of line cards 1204 to broadcast optical signals to each other. The bundle of broadcast buses 1207 enables the four line cards in the first stack of line cards 1202 to broadcast optical signals to the line cards in the second stack of line cards 1204. and the bundle of broadcast buses 1206 enables the four line cards in the second stack of line cards 1204 to broadcast optical signals to the line cards in the first stack of line cards 1202.

Figure 13:
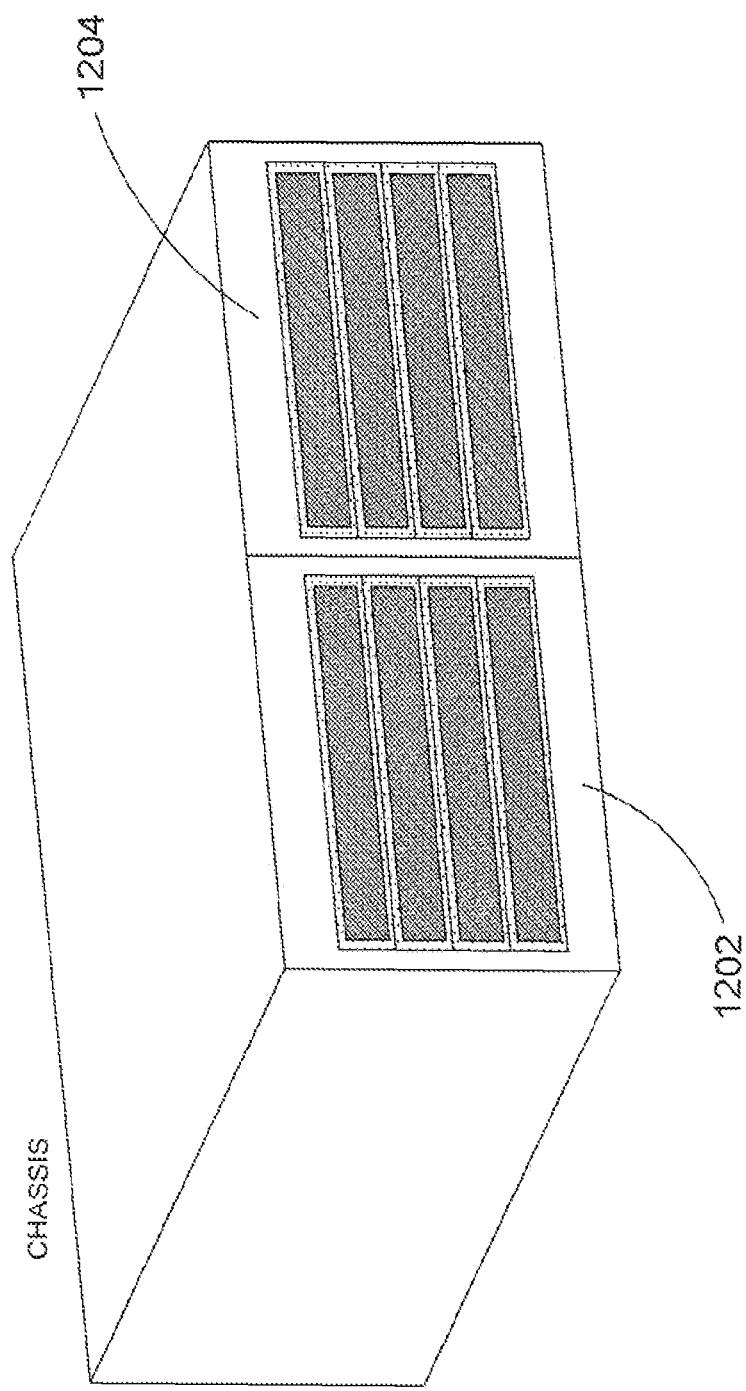
FIG. 13 shows an isometric view of a second optical switch configured with four line cards.

FIG. 13 shows an isometric view of an example optical switch 1300 configured with the two stacks four line cards 1202 and 1204. The two stacks of line cards are connected through the optical backplane 1200 and mounted in a chassis that provides a support structure for the line cards.

Optical switch examples disclosed herein are not limited to stacks with four line cards in each stack. In other optical switch examples. the number of line cards in each stack of line cards can range from as few as 2 or 3 to 5, 6. 7. or 8 or more line cards.

The foregoing description. for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical interconnect fabric comprising:
   one or more bundles of optical broadcast buses, each optical broadcast bus optically coupled at one end to a given node of a plurality of nodes and configured to transmit optical signals generated by the given node of the plurality of nodes; and
   a plurality of optical tap arrays distributed along each bundle of optical broadcast buses, wherein each optical tap array of the plurality of optical tap arrays is optically coupled to a given respective node of the plurality of nodes, and each optical tap array of the plurality of optical tap arrays is configured to divert a portion of optical power associated with each of the optical signals carried by each bundle of optical broadcast buses to only the given respective node of the plurality of nodes.

2. The optical interconnect fabric of claim 1, wherein the optical broadcast bus further comprises a plurality of waveguides.

3. The optical interconnect fabric of claim 2, wherein the waveguides further comprise at least one of hollow waveguides and optical fibers.

4. The optical interconnect fabric of claim 1, wherein the plurality of optical tap arrays distributed along a bundle of optical broadcast buses further comprises the optical tap arrays configured so that each node of the plurality of nodes receives approximately the same optical power associated with each optical signal carried in the bundle of optical broadcast buses.

5. The optical interconnect fabric of claim 1, wherein each optical tap array of the plurality of optical tap arrays comprises one or more optical taps, wherein the number of optical taps in each optical tap array equals the number of nodes.

6. The optical interconnect fabric of claim 1, wherein the optical tap arrays further comprise pellicle beamsplitters.

7. An optical switch comprising:
   an optical backplane including one or more optical interconnect fabrics; and
   a plurality of line cards, each line card optically coupled to at least one of the one or more optical interconnect fabrics, wherein each optical interconnect fabric is configured so that each optically coupled line card broadcasts data encoded in optical signals to each optical interconnect fabric, such that a given line card broadcasts a given optical signal and the given line card receives a portion of the given optical signal and a portion of each optical signal from each other line card of the plurality of line cards that is optically coupled to the optical interconnect fabric.

8. The optical switch of claim 7, wherein each optical interconnect fabrics further comprises:
   one or more bundles of optical broadcast buses, each optical broadcast bus optically coupled at one end to a line card of the plurality of line cards and configured to transmit optical signals generated by the line card of the plurality of line cards; and
   a number of optical tap arrays distributed along each bundle of optical broadcast buses, wherein each optical tap array is configured to divert a portion of optical power associated with the optical signals carried by a bundle of optical broadcast buses to each line card of the plurality of line cards.

9. The optical switch of claim 8, wherein each bundle of optical broadcast buses further comprises one or more optical broadcast buses, each optical broadcast bus further comprising a plurality of waveguides.

10. The optical switch of claim 9, wherein the waveguides further comprise at least one of hollow waveguides and optical fibers.

11. The optical switch of claim 8, wherein the number of optical tap arrays distributed along a bundle of optical broadcast buses further comprises the optical tap arrays configured so that each line card receives approximately the same optical power associated with each optical signal carried in the bundle of optical broadcast buses.

12. The optical switch of claim 8, wherein a number of optical elements along each optical broadcast bus equals the number of optical tap arrays that corresponds to the number of line cards.

13. The optical switch of claim 8, wherein the optical tap arrays further comprise pellicle beamsplitters.

14. The optical switch of claim 7, wherein each line card is configured to provide multiple external switch ports connected by an internal electronic switch fabric.

15. The optical switch of claim 7, wherein the number of line cards are arranged in two or more stacks of line cards such that each line card is connected to two or more optical interconnect fabrics enabling each line card to broadcast optical signals to other line cards in the same stack and use the other optical interconnect fabrics to broadcast optical signals to line cards in other stacks.

16. The optical interconnect fabric of claim 1, wherein each optical tap array of the plurality of optical tap arrays corresponds to a single node of the plurality of nodes.

17. An optical switch comprising:
   one or more bundles of optical broadcast buses, each optical broadcast bus being optically coupled at one end to a given node of a plurality of nodes and configured to transmit optical signals generated by the given node of the plurality of nodes; and
   a plurality of optical tap arrays, each optical tap array of the plurality of optical tap arrays distributed along the one or more bundles of optical broadcast buses,
   wherein each node of the plurality of nodes is in optical communications with at least two respective optical tap arrays of the plurality of optical tap arrays, and each optical tap array of the plurality of optical tap arrays is configured to divert a portion of optical power associated with the optical signals carried by each optical broadcast bus associated with a given bundle of optical broadcast buses to a single respective node of the plurality of nodes.

18. The optical switch of claim 17, wherein each bundle of optical broadcast buses corresponds to an optical tap array of the plurality of optical tap arrays for each node of the plurality of nodes.

19. The optical switch of claim 17, wherein at least two bundles of optical broadcast buses correspond to an optical tap array of the plurality of optical tap arrays for each node of the plurality of nodes.

20. The optical switch of claim 17, wherein each optical tap array of the plurality of optical tap arrays diverts a portion of at least two signals to the respective node of the plurality of nodes.

* * * * *